No. 800,425. PATENTED SEPT. 26, 1905.
O. S. BEYER.
CAN SEAMING MACHINE.
APPLICATION FILED JUNE 14, 1902.

4 SHEETS—SHEET 1.

No. 800,425. PATENTED SEPT. 26, 1905.
O. S. BEYER.
CAN SEAMING MACHINE.
APPLICATION FILED JUNE 14, 1902.

4 SHEETS—SHEET 2.

WITNESSES:
Fred White
Thomas Wallace

INVENTOR:
Otto S. Beyer
By Attorneys,

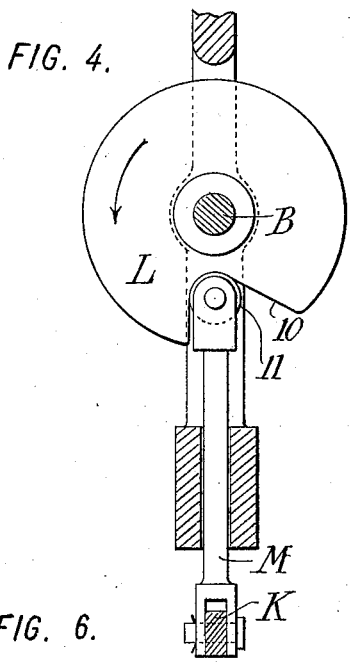
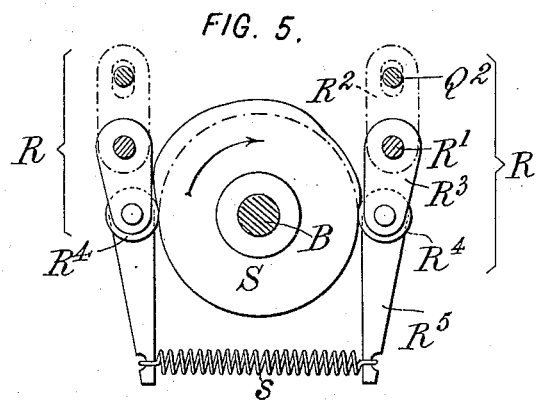
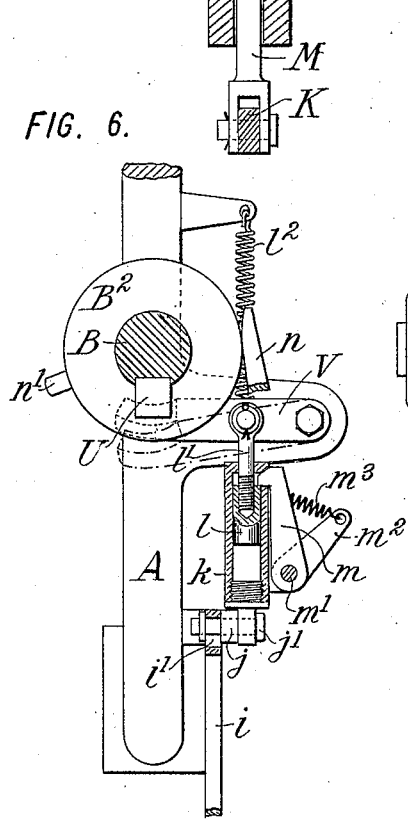
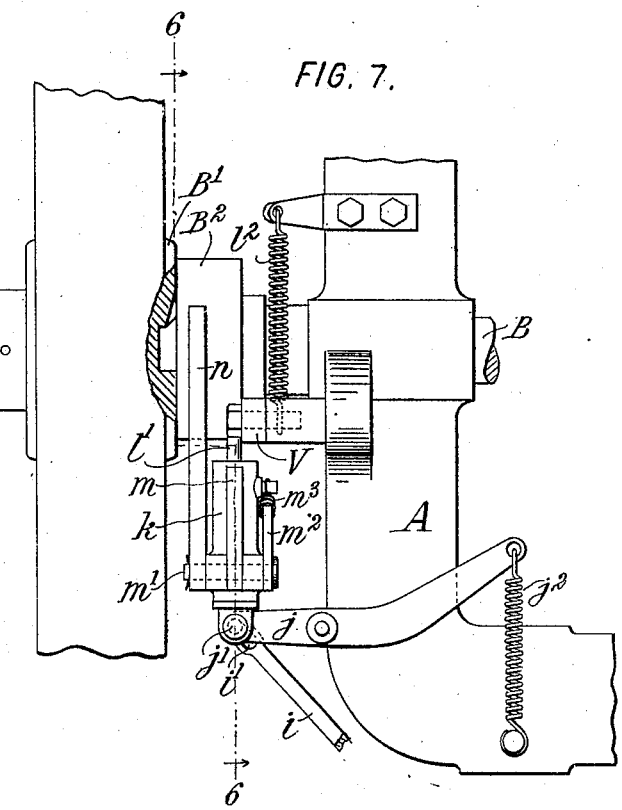

No. 800,425. PATENTED SEPT. 26, 1905.
O. S. BEYER.
CAN SEAMING MACHINE.
APPLICATION FILED JUNE 14, 1902.

4 SHEETS—SHEET 4.

WITNESSES:
Fred White
Thomas F Wallace

INVENTOR:
Otto S. Beyer,
By Attorneys,

UNITED STATES PATENT OFFICE.

OTTO S. BEYER, OF CARLSTADT, NEW JERSEY, ASSIGNOR TO E. W. BLISS COMPANY, OF BROOKLYN, NEW YORK, A CORPORATION OF WEST VIRGINIA.

CAN-SEAMING MACHINE.

No. 800,425.   Specification of Letters Patent.   Patented Sept. 26, 1905.

Application filed June 14, 1902. Serial No. 111,647.

*To all whom it may concern:*

Be it known that I, OTTO S. BEYER, a citizen of the United States, residing at Carlstadt, in the county of Bergen and State of New Jersey, have invented certain new and useful Improvements in Can-Seaming Machines, of which the following is a specification.

This invention relates to machines for making the seams for joining the heads or ends of cans to the bodies thereof.

The machine is especially adapted for the double-seaming of the heads of round or cylindrical cans.

Figure 1:
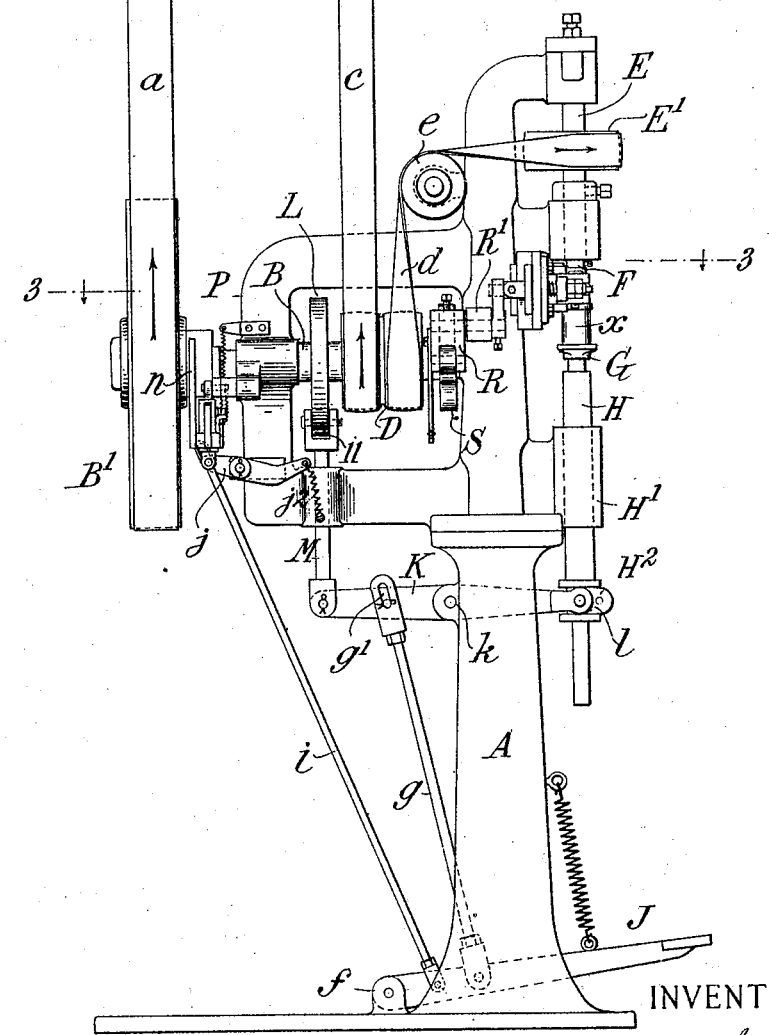
Figure 2:
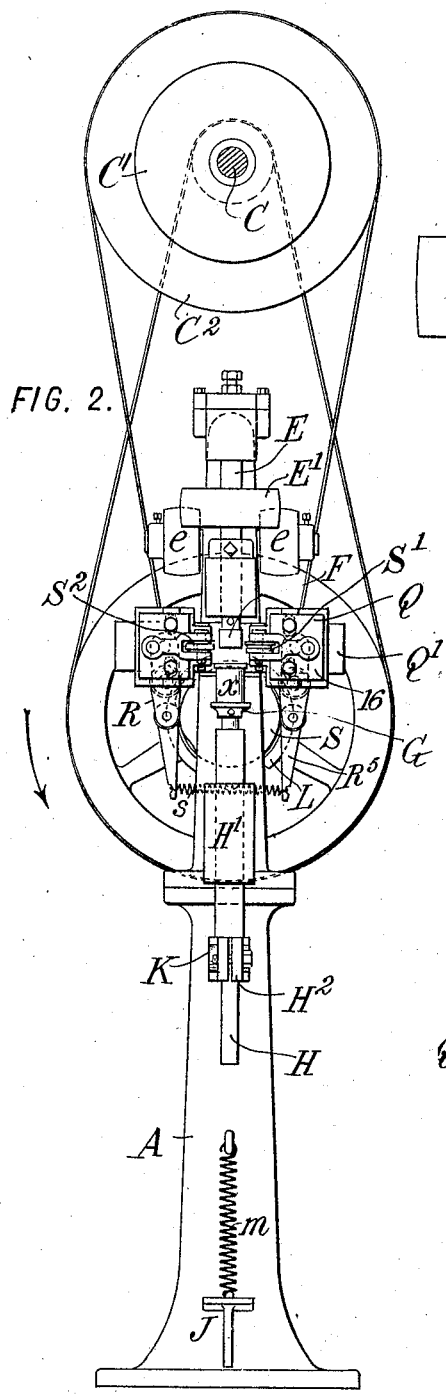
Figure 3:
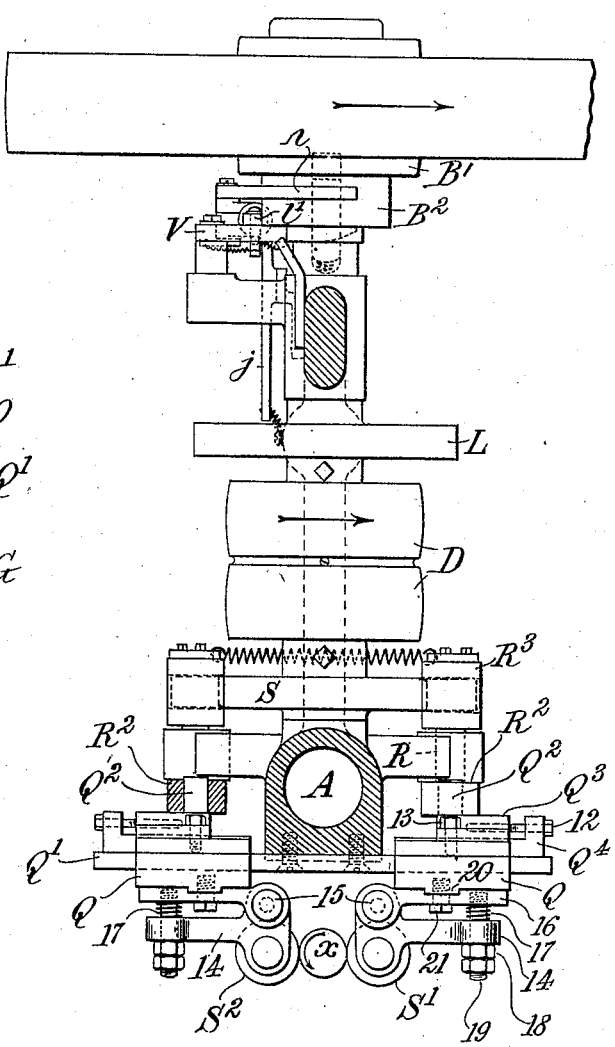
Figure 8:
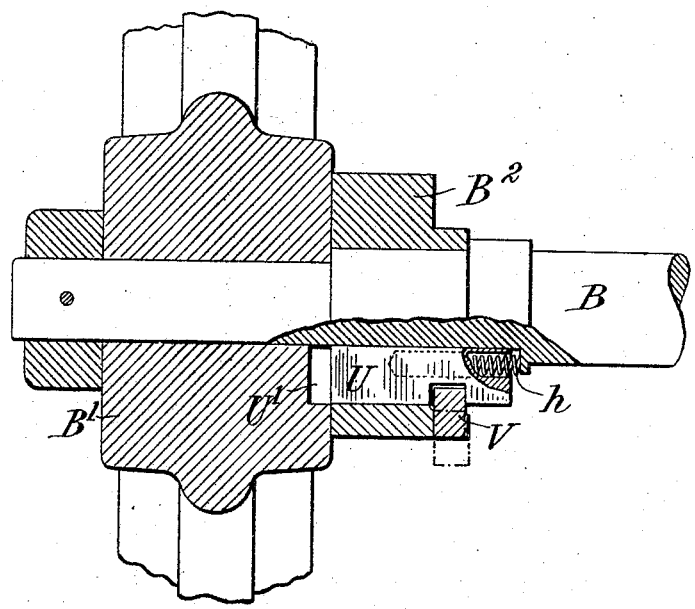
Figures 9, 10:
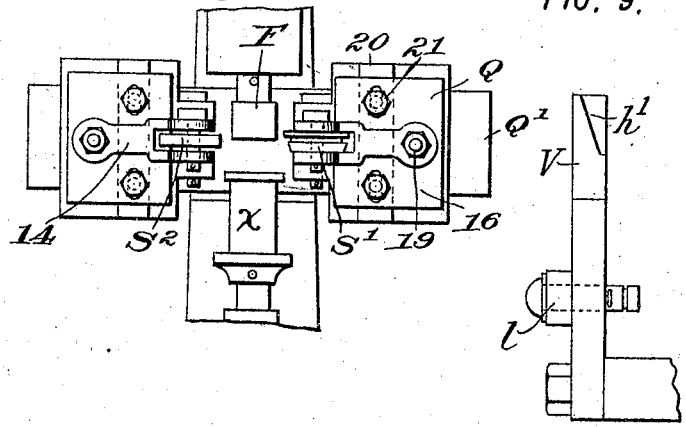

Figure 1 of the accompanying drawings is a side elevation of the machine. Fig. 2 is a front elevation thereof. Fig. 3 is a horizontal section on the line 3 3 of Fig. 1. Fig. 4 is a fragmentary sectional elevation viewed from the front. Fig. 5 is a fragmentary sectional elevation showing the seamer-cam and connections. Fig. 6 is a fragmentary sectional elevation viewed from the rear, showing the clutch-operating mechanism, the view being in section on the line 6 6 in Fig. 7. Fig. 7 is a fragmentary side elevation, partly broken away in section, showing the clutch-operating mechanism. Fig. 8 is a vertical mid-section of part of Fig. 7. Fig. 9 is a plan of the clutch-lever. Fig. 10 is an enlarged detail view.

The improved machine is of that character wherein the can-body having its head placed upon it is transferred by hand or otherwise into position on a rotatable disk or pad, which is thereupon elevated to bring the can-head into engagement with a continuously and rapidly revolving chuck, the disk and chuck together serving as a clamp to hold the can during the seaming operation. By the continued operation of the mechanism a seamer, preferably in the form of a seaming-roll, is protruded and caused to bear upon the flange of the cover to curl it inwardly and downwardly beneath the flange of the can and to force both flanges inwardly toward the can-body. Thereupon a second seamer, preferably also a seaming-roll, is caused to engage the can-head and acts to flatten and compress the double seam against the can-head, which is firmly supported by the chuck. After the two seamers have receded the can-clamp opens to release the can, preferably by the descent of the disk or pad, whereupon the can is removed and replaced by another to be operated on. The mechanism for operating the seamers and for controlling the operation of the can-clamp is preferably started by the operator, who moves a treadle or other lever for that purpose, and after the series of operations necessary to complete the head of one can these parts preferably come to rest, although the invention does not exclude a continuous operation of these mechanisms.

Referring to the drawings, let A designate any suitable framework for supporting the working parts. In the construction shown the frame is provided with bearings in which may turn a main shaft B, on which turns loosely a pulley B', which is driven by a belt *a* from a smaller pulley *a'* on a counter-shaft C, located in any convenient manner, preferably above the machine, being shown as turning in hangers or bearings *b b* of any suitable kind and driven by a belt on a pulley C'. Turning loosely on the shaft B is a double pulley D, which is driven by a belt *c* from a large pulley $C^2$ on the counter-shaft C and which in turn drives through a belt *d*, passing over angle-pulleys *e e*, a pulley E', fixed on a vertical shaft E, having bearings in the frame A. The proportions are such that the pulley B' is driven at a low speed, while the vertical shaft E is driven at a high speed. The pulley B' turns loosely upon the shaft B until it is clutched thereto by means of some operating part acting to engage any suitable clutch, as will be presently described.

On the lower end of the shaft E is fixed a disk F, constituting the chuck forming the upper member of the clamp by which the can is held during the seaming operation. The lower part of this clamp is a rotatable disk or pad G, which is swiveled on a vertically-movable slide H, sliding in a bearing H' on the frame.

The can is clamped by means of a treadle or other lever J, shown as pivoted to the base at *f* and connected by a rod *g* to a lever K, pivoted at *k*, the opposite arm of which is forked and engages at *l* with flanges on or attached to the slide H, and preferably adjustable vertically thereon by being formed on a movable collar $H^2$, which can be set to any height on the slide H by means of a set-screw. It follows from this construction that pressing down the treadle J forces up the slide H, so that a can placed on the pad G is pushed up until its head is clamped against the chuck F. To relieve the operator of the necessity of holding the treadle depressed in order to keep the can-clamp properly engaged upon the can during the seaming operation, I provide means whereby when the treadle is once depressed mechanism is brought into action for holding the clamp closed upon the can until the end of the operation and then opening the clamp to release the can, or, in other words, for holding the slide H elevated and then mechanically lowering it at the proper time. To this end I provide upon the horizontal shaft B a cam-disk L, which has a notch 10, which in the position of rest (see Fig. 4) engages a roller 11, carried on the upper end of a sliding rod M, which is connected to the rear end of the lever K. The pressing down of the treadle J acts through a rod $i$ to operate a clutch P for engaging the pulley B' to the shaft B. Thereupon the shaft B rotates during one revolution, carrying the cam L with it in the direction of the arrow, Fig. 4. As soon as this cam begins to revolve its notch passes the roller 11, thereby preventing any return movement of this roller or of the lever K, and hence preventing the descent of the slide H and the release of the can. Thus the cam L acts to hold the slide H elevated until the cam has executed one revolution, whereupon (the operator having previously released the treadle) the roller 11 falls back into the notch 10 and thereby through the connected parts lowers the slide H and releases the can, this operation being completed just as the shaft B is unclutched from the driving-pulley B' and comes to rest. If the operator has failed to release the treadle, the shaft B nevertheless stops, and when the treadle is released the roller 11 may enter the notch 10 and permit the lowering of the pad G to release the can.

The seam is turned by a seamer or seamers of any usual construction. Preferably I employ seaming-rolls S' S², preferably arranged on opposite sides of the can, as shown in Fig. 3. The seamers are caused to gradually approach the can to turn and roll down the seam and then to recede therefrom. The seamer S' first approaches the can to turn in the seam on the can-head in the usual manner, whereupon the seamer S² approaches and rolls down the seam. The seamer S' preferably recedes before the seamer S² begins to act.

Each of the seamers S' S² is mounted upon a carriage Q, the two carriages Q Q being arranged to slide upon any suitable ways carried on the main frame A. In the construction shown each carriage Q is formed as a slide arranged to move upon a transverse slideway Q'. Upon the back of the slide Q is mounted a pin or roller Q², which is engaged in a slot or fork in an arm R², forming part of a lever R. The middle part of this lever R consists of a rock-shaft R', turning in bearings on the frame A, this shaft having fixed on its rear end the upwardly-projecting arm R² and on its front end a downwardly-projecting arm R³, carrying, preferably, an antifriction-roller R⁴, which bears against the surface of a cam S, which is fixed on the shaft B. A prolongation R⁵ of the lever is engaged by a spring $s$, which acts to press the roller R⁴ against the cam, and accordingly to press the seamer-slide outward or away from the can. The two levers R R are arranged on opposite sides of the same cam S, so that one spring $s$ serves for both. The cam S makes one revolution to the seaming of each can. It is engaged on diametrically opposite sides by the rollers R⁴ R⁴, and starting from the position shown in Fig. 5 its projecting portion acts first on the right-hand roller, thereby causing the right-hand seamer S' to approach the blank and turn in the flanges, which operations are performed during the first half-revolution, after which the cam projections engage the left-hand roller and force the left-hand seamer S² in like manner toward the can being operated on, the right-hand seamer receding at or before the beginning of the approaching movement of the left-hand seamer, which latter recedes toward the end of the complete revolution, thereby releasing the seamed can. The described construction imparts movements to both seamers from the one cam S.

In order that the seamers may be set out or in, and thereby adapted to cans of varying diameters, provision is made for adjusting the position of the pin or roller Q² of each carriage Q relatively to such carriage or slide. To this end the carriage or slide Q is made with a rear part Q³, which is adapted to slide upon the main portion, being adjusted thereon by a screw 12, engaging an arm Q⁴ and fastened by screws 13. By loosening the screws 13 and turning the screw 12 the slide Q may be adjusted to right or left to bring the seamer S' or S² to the adjusted position, whereupon the screws 13 are retightened.

To render the seamers S' S² yielding, so as to allow for slight variations in the thickness of the metal of the blank and enable them to yield in passing over the side seam, they are mounted on their respective carriages Q through the medium of a yielding connection consisting of a lever 14, pivoted at 15 to an arm or plate 16, which is fastened against the face of the carriage or slide Q, the lever being pressed outwardly by a stiff spring 17 and adjusted against the stress of this spring by means of nuts 18, screwing on a stud 19, projecting from the plate 16. To enable the seamers to be adjusted vertically in order to bring them into exact vertical coincidence with the seam to be formed, the plates 16 are made vertically adjustable on the carriages Q. The carriage Q is formed with a vertical rib 20 on its front face engaged by a groove in the plate 16, so that by loosening the fastening-screws 21 the plate 16 can be set slightly higher or lower, the holes through which these screws pass being sufficiently large to allow of the requisite motion, as shown in Fig. 10.

I will describe briefly the construction of one-revolution clutch for coupling the shaft B to the pulley B'. This clutch is in the main an old and well-known construction of one-revolution clutch and may in carrying my invention into practice be substituted by any other suitable clutch having equivalent capabilities. As best shown in Fig. 8, the shaft B carries a collar $B^2$ and is provided with a sliding bolt U, movable in a keyway in the shaft and through a recess in the collar, being pressed normally forward by an internal spring $h$ and normally held back by a releasing lever or dog V. (Shown in plan in Fig. 9.) When the lever V is pulled down out of the notch in the bolt U, the latter is pressed forward by spring $h$, and its end enters a recess U' in the hub of the revolving pulley B', (there being one or more, usually three, of these recesses,) so that it locks the pulley and shaft together, and the shaft is caused to turn with the pulley. At the end of one revolution the lever V, which has meanwhile been released, is reengaged by the notch in the bolt U, which latter slides against its inclined face $h'$, Fig. 9, whereby the bolt U is withdrawn, thereby unclutching the shaft, which is stopped by the engagement of the bolt U with the lever V. The lever V is pulled down to engage the clutch by the pressing down of the treadle J, with which it is connected through the medium of a rod $i$ and a detent mechanism. The upper end of the rod $i$ is formed with a slot $i'$, which engages a pin $j''$ on a lever $j$, which lever is acted on by a spring $j^2$, tending to press up the end carrying the pin $j''$. To this pin is jointed the lower end of a shell or cylinder $k$, in which is a plunger $l$, connected by a stem $l'$ to the lever V. A spring $l^2$ exerts a constant upward pressure on the lever V. To ears on the shell $k$ is pivoted a hook $m$, constituting a catch or latch, the hooked end of which enters through a slot in the shell and takes over the plunger $l$. The hook $m$ is fixed on a shaft $m'$, on which also is fixed an arm $m^2$, to which is attached a spring $m^3$, which causes the hook $m$ to constantly tend to engage itself with the plunger $l$. On the shaft $m'$ is also fixed an arm $n$, which projects up along the collar $B^2$ and is adapted to be struck by a pin or projection $n'$ thereon, whereby to force out the hook $m$ and cause it to disengage from the plunger $l$.

The operation of the clutch mechanism is as follows: On pressing down the treadle J motion is communicated to pull down the pin $j''$, and with it the shell $k$, and through the hook $m$ to pull down, also, the plunger $l$, and hence to pull down the lever V to the position shown in dotted lines in Figs. 7 and 8, thereby freeing the bolt U, which engages the hub and clutches the shaft to the pulley. Thereupon the shaft revolves with the pulley. At some suitable point during the revolution the pin $n'$ strikes the arm $n$ and knocks out the hook $m$, whereupon, the plunger $l$ being free, the spring $l^2$ pulls up the lever V to its original position, so that its inclined end $h'$ stands ready to reëngage the bolt U. At the end of the revolution the bolt U being carried around with the shaft B engages this lever and is retracted thereby, thereby unclutching and stopping the shaft. Assuming the treadle to have been previously released by the operator, the completion of the revolution causes the treadle to rise by the roller 11 entering the notch 10 of the cam L, Fig. 4, thereby raising the rod $i$ so that it no longer holds the pin $j''$ pulled down, whereupon the spring $j^2$ acts to press up this pin, and consequently to push up the shell $k$ and hook $m$, so that the latter again takes over the plunger $l$, so that the parts are ready to repeat the operation when the operator shall next depress the treadle. The action of the pin $n'$ (or cam projection) in disengaging the hook $m$ insures the unclutching and stoppage of the shaft at the end of one revolution independently of whether the operator keeps the treadle depressed or not. Any other automatic clutch adapted when engaged to couple the shaft to the pulley for one revolution and then automatically disengage it and stop the shaft may be applied in place of the one just described.

My invention may be modified in mechanical details to a considerable extent without departing from its essential features, which are hereinafter set forth in the claims.

What I claim is—

1. A can-seaming machine comprising a chuck and clamp for revolving a can, a pair of seamers movable toward and from the can, a cam having a rotative movement in a single direction relatively to the seamers and adapted to make one continuous revolution to the seaming of each can, and two rollers bearing against it at different points in its circumference and adapted to be successively acted upon by the same cam-surfaces, said rollers being connected to the respective seamers to cause the latter to move into contact with the can.

2. In a can-seaming machine, the combination of a clamp for revolving the can, seamers adapted to act against the can, a cam having a rotative movement in a single direction relatively to the seamers whereby to operate the same, rollers mounted in the same plane and bearing against the periphery of said can at opposite sides thereof and connected to the respective seamers for forcing them into contact with the can, and means for retracting them from the can.

3. In a can-seaming machine, the combination of a can-clamp, seamers, a single continuously-revolving cam, rollers mounted in the same plane, and bearing against opposite sides of said cam and connected to said seamers for forcing them into contact with the can, and a single spring acting against the respective rollers for pressing them toward said cam and for retracting the seamers.

4. In a can-seaming machine, the combination of an upright frame, a cross-bar fixed thereon, a seamer, a carriage for said seamer mounted on said cross-bar to slide thereon, a revolving cam, and a connection from said cam to said carriage for moving the seamer into contact with the work.

5. In a can-seaming machine, the combination of an upright frame, a chuck-carrying shaft mounted in said frame, a cross-bar mounted transversely of said frame, a carriage adapted to slide on said bar, a seamer connected to said carriage, and means for advancing the carriage to bring the seamer into contact with the work.

6. In a can-seaming machine, the combination of an upright frame, a chuck-carrying shaft mounted in said frame, a cross-bar mounted transversely of said frame, a pair of seamers, carriages for said seamers adapted to slide on said bar, and means for advancing said carriages to bring the seamers into contact with the work.

7. In a can-seaming machine, the combination of an upright frame, a cross-bar Q' fixed thereon, a pair of seamers, carriages for the respective seamers mounted to slide on said cross-bar, cam-driven mechanism for moving said seamers into contact with the work, and adjustable connections between said mechanism and the carriages.

8. In a can-seaming machine, the combination of an upright frame, carriages sliding transversely thereon, plates vertically adjustable on said carriages, seamers carried by said plates, and means for moving said carriers to advance said seamers into contact with the work, and to retract them therefrom.

9. In a can-seaming machine, the combination of a seamer-carriage mounted to slide transversely, a lever fulcrumed to said carriage, a seamer carried by said lever, and means for reciprocating the carriage to bring the seamer into and out of operative position.

10. In a can-seaming machine, the combination of a seamer-carriage mounted to slide transversely, a lever fulcrumed to said carriage, a seamer carried by said lever, a spring between said lever and said carriage tending to press said seamer toward the work, and means for reciprocating the carriage to move the seamer into and out of operative position.

11. In a can-seaming machine, the combination of a seamer-carriage mounted to slide transversely, a lever fulcrumed to said carriage, a seamer carried by said lever, means for adjusting the movements of the lever, a spring between said lever and said carriage tending to press said seamer toward the work, and means for reciprocating the carriage to move the seamer into and out of operative position.

12. In a can-seaming machine, the combination of a horizontally-moving carriage, a seamer carried thereby, a sliding block adjustable on said carriage, a cam, and a roller engaging said cam and connected to said adjustable block for communicating the movement from the cam to the carriage to move the seamer into and out of operative position, whereby to admit of the adjustment of the seamer.

13. In a can-seaming machine, the combination of a seamer, a sliding carriage carrying it, a cam, a roller engaging said cam, a lever carrying said roller on one arm and engaging said carriage on the other, and a spring for pressing said roller against the cam.

14. In a can-seaming machine, a vertical shaft carrying a chuck, a shaft carrying the cam for advancing and retracting the seamer, a counter-shaft for driving both, belted from a small to a large pulley for driving the cam-shaft at a relatively low speed, and from a large to a small pulley for driving the vertical shaft at a relatively high speed.

15. In a can-seaming machine, a vertical shaft carrying a chuck, a horizontal shaft carrying the cam for advancing and retracting the seamer, a counter-shaft for driving both, a loose pulley on said horizontal shaft belted through angle-belts to said vertical shaft, and belts from a small pulley on the counter-shaft to a large pulley on the horizontal shaft, and from a large pulley on the counter-shaft to said loose pulley for driving the cam-shaft at a relatively low speed and the chuck at a relatively high speed.

In witness whereof I have hereunto signed my name in the presence of two subscribing witnesses.

OTTO S. BEYER.

Witnesses:
FRED. H. McGAHIE,
H. E. PORTER.